Oct. 21, 1952     I. B. LASKOWITZ     2,614,790
QUICK CLOSING SUBSTANTIALLY BALANCED GATE VALVE
Filed Nov. 19, 1946

INVENTOR.
Isidor B. Laskowitz
BY
ATTORNEY

Patented Oct. 21, 1952

2,614,790

UNITED STATES PATENT OFFICE 2,614,790

QUICK-CLOSING SUBSTANTIALLY BALANCED GATE VALVE

Isidor B. Laskowitz, Brooklyn, N. Y.

Application November 19, 1946, Serial No. 710,834

2 Claims. (Cl. 251—18)

This invention relates to valves and more particularly to substantially balanced gate valves.

It is an important object of this invention to provide a movable valve element that is adapted to stop the flow through a valve body no matter in which direction the flow of fluid is directed.

It is also an object of this invention to produce a valve element that is provided with positive means to easily operate the valve element to open or close the same as well as regulate the amount of opening or closing of the valve element to regulate the flow of fluid through the valve body.

It is furthermore an object of this invention to provide in the valve body a double walled partition having spaced valve seats cooperating with equally spaced valve seats on the movable valve element.

It is an object of this invention to provide a movable open ended tubular ring shaped valve element constituting a portion of a truncated tube the truncated ends of which constitute valve seats on the movable valve element. The truncated ends may be either parallel or converging, preferably only slightly converging.

It is a further object of this invention to provide a valve element of such mechanical design or contour so as to lend itself to substantially balanced pressures when operating or when in open or closed position thereby reducing stresses and strains on the valve element and on its operating means as well as the mounting means for the valve element.

It is also an object of my invention to provide in the valve body inspection openings having closures therefor whereby an investigation of the condition of the interior of the valve body and its valve seats as well as the condition of the movable valve element, may be ascertained.

Other objects and advantages will be revealed in the detailed description of my preferred embodiment disclosed on my drawings which constitute a part of my application.

Figure 1:
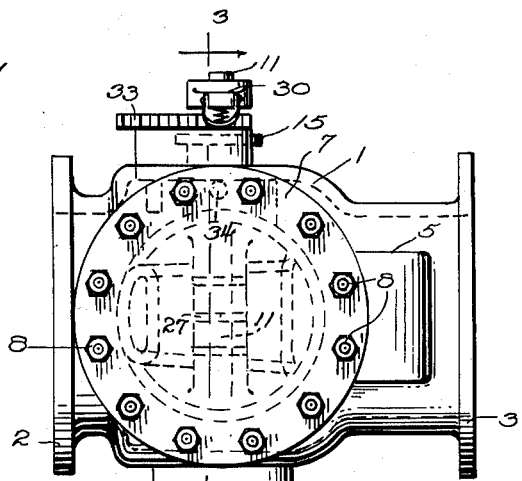
Fig. 1 is a plan view of my balanced pressure valve.

The drawing is merely illustrative and not definitive of my invention except as claimed herein.

The reference characters identify the parts and details of my valve in both the specification and drawings.

The hollow valve body 1 is provided with flanged tubular portions 2 and 3 so that the fluid may flow through the open valve in either direction. The tubular portions may be coaxial as shown but they may be differently constructed to suit any other condition required.

Figure 3:
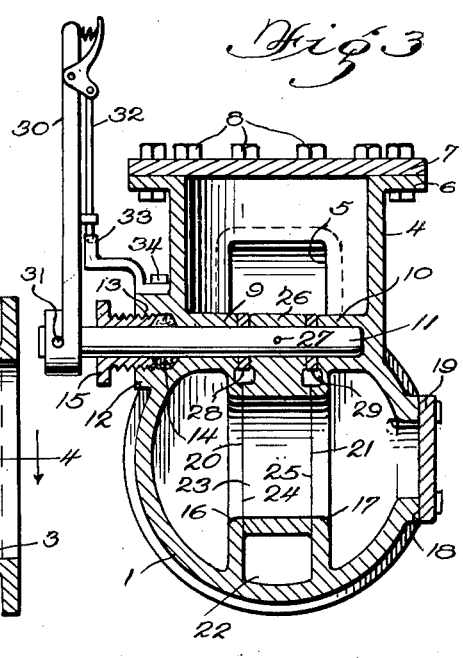
Fig. 3 is a vertical transverse sectional view of my valve including the mounting and operating means for the valve element.

The body 1 is provided with an upright tubular extension 4 including a pocket 5. The extension 4 is provided with an apertured flange 6 to which a closure 7 is secured by bolts 8. The pocket 5 receives a portion of the valve element when in open or partly open condition. The body 1 is also provided with spaced coaxially aligned apertured bosses 9 and 10 constituting bearings to receive a shaft 11 for operating the valve element. The boss 9 and the body 1 has an external extension 12 on the body 1 coaxial with the bosses 9 and 10. The external extension 12 is provided with a screw threaded tubular portion 13 to receive gland packing 14 and a gland nut 15. The body 1 is further provided with a double walled partition having walls 16 and 17 spaced from each other and from the walls of the body 1 except the portions of the partition integral with the body and the bosses thereof. The valve body is also provided with a shallow tubular lateral extension 18 provided with a cover 19 bolted thereto as shown in Fig. 3. This lateral tubular extension 18 constitutes an inspection opening and it may be coaxial with the aligned apertures in the walls 16 and 17. The opposed walls 16 and 17 have inwardly extending projections formed around the openings to provide annular valve seats 20 and 21 adjacent the front and rear portions of the partition. The space 22 is in direct communication with the tubular portion 3.

The valve element 23 is of particular mechanical design or contour comprising an open ended tubular ring or truncated tube. The truncated ends or edge faces constitute valve faces 24 and 25 adapted to coact with the annular valve seats 20 and 21, respectively. The valve element 23 is provided with an apertured ear 26 to receive the shaft 11 secured thereto by a cross pin 27. Washers 28 and 29 are located on the shaft 11 one on each side of the ear 26 and engaging the bosses 9 and 10. These washers prevent undue longitudinal movement of the shaft 11 and thereby prevent undue lateral movement of the valve element 23. The washers may be made of any suitable material such as bronze and they may also be shaped or bowed to make them slightly yieldable if desired.

The operating means comprises a handle 30 secured on the end portion of the shaft 11 by a cross pin 31. The handle 30 is provided with a spring actuated and guided detent 32. The detent cooperates with a notched sector 33 provided with a bracket arm bolted to the external extension 12 by the bolt 34.

Figure 2:
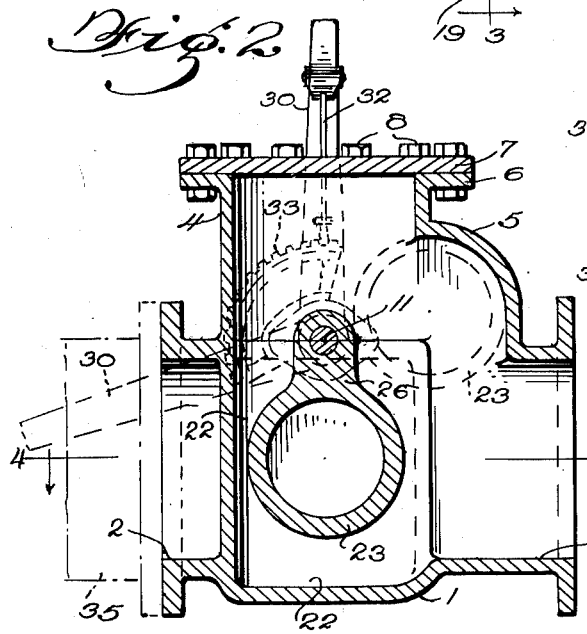
Fig. 2 is a substantially vertical section taken longitudinally and centrally therethrough and showing the ring valve element in vertical section including the mounting means therefor.
Figure 4:
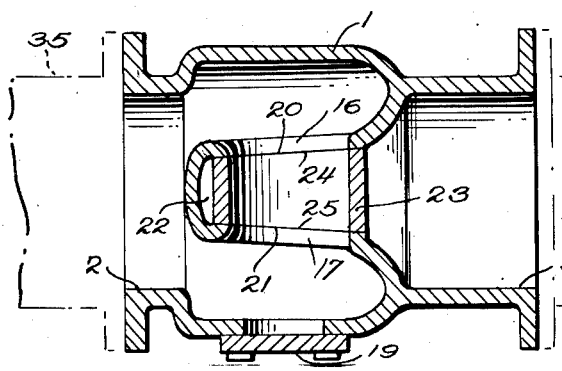
Fig. 4 is a longitudinal horizontal sectional view taken substantially on the line 4—4 of Fig. 2, looking in the direction of the arrows and portions of pipe connections are shown to the right and left thereof in dot and dash lines.

The valve seats 20, 21, and the valve faces 24 and 25 may be substantially parallel to each other but it is preferred that the planes defining the valve seats be inclined to converge toward each other at a position to the left side of the valve construction as disclosed in Figs. 2 and 4, whereby the most forward portion of the movable valve element 23 is the narrowest and the most rearward portion is the broadest. By having the valve seats thus inclined a wedging and tightly sealing action may be produced.

The pipe portions 35 and 36, shown in dot and dash lines in Figs. 2 and 4, merely indicate schematically how flanged pipe sections may be secured to any valve by bolts (not shown) or otherwise secured.

Operation

From the above description the general operation of my valve appears to be obvious and consequently only the distribution of fluid pressure requires consideration. In this connection attention is primarily directed to the consideration of Figs. 2 and 4. Let it be assumed, first, that the fluid is flowing from the right to the left, when the valve element 23 is open as shown in dash lines of Fig. 2, through the body 1. In this condition the element 23 will be entirely surrounded by fluid so that no unbalanced component of pressure appears to be of any material consequence in the movement or operation of the element 23. The flow, as assumed in the foregoing premise, will be into the tubular extension 3, then between the spaced walls 16 and 17 and through the apertures thereof into the valve body 1 and finally out through the tubular extension 2.

Now let it be assumed that the open ended tubular ring valve element 23 is closed, as shown in Figs. 2 and 4, and the fluid flow is stopped. The pressure is assumed to be from the right to the left and is normally distributed about the circumference of open ended tubular ring valve element 23, so that, if the open ended tubular ring is wedge shaped, as shown in Fig. 4, then the increased area withstands the greater pressure because: "the total pressure on any surface is the product of the pressure per unit area multiplied by the number of units of area." It follows, therefore, that the greater the area the greater the pressure. It is also conclusive that the pressure as applied to the open ended tubular ring valve element 23 of Fig. 4 under the conditions assumed would tend to hold the open ended tubular ring valve element 23 closed. The less the convergence of the planes defining the valve seats, the more nearly the pressure becomes equalized on opposite outside portions of the open ended tubular ring valve element 23. If the valve seats 20, 21, and the valve faces 24 and 25 are made parallel to each other, then the pressure is totally equalized.

Now, if it is assumed that the open ended tubular ring valve element 23 is closed, as in Figs. 2 and 4, and the fluid pressure is in the portion 2 of the valve body 1, then the pressure would tend to open the valve element 23, since all of the pressure applied would be on the inside of the open ended tubular ring valve element 23. If the valve seats are made parallel, under the conditions last named, the pressure on all inside portions of the valve element would be totally equalized and there would be no pressure tendency to either open or close the valve element.

It is observed generally that if the valve seats are substantially parallel, then the pressures on the valve element are substantially equalized or balanced.

It is contemplated that any relative amount of inclination of the valve seats 20, 21, 24 and 25 may be adopted, in fact, the valve seats may be parallel, substantially parallel, and the difference between inclined valve seats and parallel valve seats may be so slight that such difference may be less than any assignable quantity.

My tubular ring valve element 23 is just like a ring lying in water, providing there is water on both sides of the valve element under equal pressure in the valve body 1. It is also contemplated that my tubular ring valve element should be made strong enough to prevent collapsing or bursting by expansion force within the tubular ring 23 even if the liquid pressure is very high.

It will thus be seen from the foregoing description, that I have provided a quick-closing balanced wedge gate valve that will at all times be positive and efficient in its operation, and furthermore, the valve can be opened and closed quickly with little effort. The simplicity of my improved gate valve renders the same light, inexpensive in its manufacture, yet strong and durable.

While I have shown the preferred embodiment of my invention, it is to be understood that minor changes in the size, shape and arrangement of parts may be resorted to, without departing from the spirit of the invention and the scope of the appended claims.

Having thus described the invention, what I claim is:

1. In a gate valve, the combination of a body provided with aligned inlet and outlet chambers at its respective ends, a partition member arranged vertically and centrally within the body and comprising spaced side walls connected together at their forward edges by a curved wall, the latter being disposed adjacent the inlet chamber, said side walls diverging gradually from the curved front wall and merging at their rear edges with the adjacent sides of the valve body adjacent the outlet chamber, said side walls being formed with registering ports, inwardly extending projections formed on the inner faces of the side walls around the ports to provide annular valve seats adjacent the front and rear portions of the partition member, a truncated open-ended ring forming a valve element mounted for vertical swinging movement between the side walls of the partition member, the edge faces of the ring coacting with the annular valve seats on said side walls, and means for manually actuating the valve element for moving the same to either an open or closed position.

2. In a gate valve, the combination of a body provided with aligned inlet and outlet chambers at its respective ends, a partition member arranged vertically and centrally within the body and comprising spaced side walls connected together at their forward edges by a curved wall, the latter being disposed adjacent the inlet chamber, said side walls diverging gradually from the curved front wall and merging at their rear edges with the adjacent sides of the valve body adjacent the outlet chamber, said side walls being formed with registering ports, inwardly extending projections formed on the inner faces of the side walls around the ports to provide annular valve seats adjacent the front and rear portions of the partition member, a truncated open-ended ring forming a valve element mounted for vertical swinging movement between the side walls of the partition member, the edge faces of the ring coacting with the annular valve seats on said side walls, and means for manually actuating the valve element for moving the same to either an open or closed position, said means including an oscillating shaft extending transversely into the valve body above the partition member, an ear extending upwardly from the valve element and connected to said shaft, and an actuating lever secured on the outer end of the oscillating shaft.

ISIDOR B. LASKOWITZ.

REFERENCES CITED

The following references are of record in the file of this patent:

UNITED STATES PATENTS

| Number | Name | Date |
| --- | --- | --- |
| 360,167 | Lunkenheimer | Mar. 29, 1887 |
| 495,739 | Kennedy | Apr. 18, 1893 |
| 911,353 | Williams | Feb. 2, 1909 |
| 994,955 | Sayre | June 13, 1911 |
| 1,109,774 | Lutes | Sept 8, 1914 |
| 1,839,683 | Laskowitz | Jan. 5, 1932 |